US012568196B2

(12) United States Patent
Van Kuringen et al.

(10) Patent No.: US 12,568,196 B2
(45) Date of Patent: Mar. 3, 2026

(54) AUTOSTEREOSCOPIC DISPLAY DEVICE PRESENTING 3D-VIEW AND 3D-SOUND

(71) Applicant: DIMENCO HOLDING B.V., Veldhoven (NL)

(72) Inventors: Hubertus Petrus Cornelis Van Kuringen, Veldhoven (NL); Rick Johannes Cornelis Merks, Veldhoven (NL); Pieter Wilhelmus Theodorus De Jong, Veldhoven (NL)

(73) Assignee: Dimenco Holding B.V., Veldhoven (NL)

( * ) Notice: Subject to any disclaimer, the term of this patent is extended or adjusted under 35 U.S.C. 154(b) by 0 days.

(21) Appl. No.: 18/719,724

(22) PCT Filed: Dec. 17, 2022

(86) PCT No.: PCT/NL2022/050728
§ 371 (c)(1),
(2) Date: Jun. 13, 2024

(87) PCT Pub. No.: WO2023/113603
PCT Pub. Date: Jun. 22, 2023

(65) Prior Publication Data
US 2025/0063153 A1      Feb. 20, 2025

(30) Foreign Application Priority Data

Dec. 17, 2021    (NL) ..................................... 2030186

(51) Int. Cl.
*H04N 13/302*        (2018.01)
*H04N 13/383*        (2018.01)
*H04S 7/00*          (2006.01)
(52) U.S. Cl.
CPC ......... *H04N 13/302* (2018.05); *H04N 13/383* (2018.05); *H04S 7/304* (2013.01)

(58) Field of Classification Search
CPC ..... H04N 13/302; H04N 13/383; H04S 7/304
(Continued)

(56) References Cited

U.S. PATENT DOCUMENTS

| 5,495,576 A | 2/1996 | Ritchey |
| 10,746,872 B2 | 8/2020 | Piskun |
| (Continued) | | |

FOREIGN PATENT DOCUMENTS

| EP | 3623913 A1 | 3/2020 |
| TW | 201426010 A | 7/2014 |
| (Continued) | | |

OTHER PUBLICATIONS

International Search Report for PCT/NL2022/050728, mailed Mar. 9, 2023, 3 pages.
(Continued)

*Primary Examiner* — Thai Q Tran
(74) *Attorney, Agent, or Firm* — Schwegman, Lundberg & Woessner, P.A.

(57) ABSTRACT

The invention relates to method for simultaneously presenting to a viewer of an autostereoscopic display device a three-dimensional image and three-dimensional sound, wherein the method comprises adapting the three-dimensional image as well as the three-dimensional sound to the position of the eyes and the ears of the viewer relative to the autostereoscopic display device. In this way, image and sound of one and the same virtual scene can simultaneously be presented to a viewer as if they were of a real scene; both are experienced three-dimensionally and in accordance with movement of the viewer in the scene. Moreover, this is also achieved for interactions of a viewer with the scene, e.g. with virtual objects displayed on the autostereoscopic display device. In this way, the viewer is provided with an (Continued)

increased immersion in the scene, which may find a useful application in e.g. teleconferencing and computer gaming.

19 Claims, 2 Drawing Sheets

(58) Field of Classification Search
USPC .......................................................... 348/51
See application file for complete search history.

(56) References Cited

U.S. PATENT DOCUMENTS

| | | | | |
|---|---|---|---|---|
| 2011/0157327 | A1* | 6/2011 | Seshadri | H04N 21/235 |
| | | | | 348/51 |
| 2013/0267317 | A1* | 10/2013 | Aoki | G07F 17/3211 |
| | | | | 463/32 |
| 2014/0328505 | A1* | 11/2014 | Heinemann | G06F 3/012 |
| | | | | 381/303 |
| 2015/0208166 | A1* | 7/2015 | Raghuvanshi | H04S 7/303 |
| | | | | 381/71.6 |
| 2018/0157459 | A1 | 6/2018 | Turner | |
| 2024/0264682 | A1* | 8/2024 | Zheng | G06F 3/04845 |

FOREIGN PATENT DOCUMENTS

| | | | | |
|---|---|---|---|---|
| TW | 202027829 A | | 8/2020 | |
| WO | WO-2005089360 A2 | * | 9/2005 | H04S 7/30 |
| WO | WO-2022115119 A1 | * | 6/2022 | H04N 7/157 |

OTHER PUBLICATIONS

Written Opinion of the ISA for PCT/NL2022/050728, mailed Mar. 9, 2023, 9 pages.
Taiwanese Office Action dated Feb. 15, 2024 issued in corresponding Taiwanese Patent Application No. 111148386 with translation.
Taiwanese Search Report dated Nov. 10, 2023 issued in Taiwanese Patent Application No. 111148386 with translation.

* cited by examiner

A                B

AUTOSTEREOSCOPIC DISPLAY DEVICE PRESENTING 3D-VIEW AND 3D-SOUND

CROSS-REFERENCE TO RELATED APPLICATIONS

This application is the U.S. national phase of International Application No. PCT/NL2022/050728 filed Dec. 17, 2022, which designated the U.S. and claims priority to NL 2030186 filed Dec. 17, 2021, the entire contents of each of which are hereby incorporated by reference.

FIELD OF THE INVENTION

The invention relates to a method and device for simultaneously presenting to a viewer a three-dimensional image displayed by an autostereoscopic display device and a three-dimensional sound.

BACKGROUND

Autostereoscopic displays have attracted great attention in the last two decades. One of their most outstanding features is that they allow a viewer to perceive three-dimensional images without a dedicated eyewear device, also when the viewer moves relative to the display. Key to this technology is the presence of an eye tracker in combination with a screen that comprises a lenticular lens or parallax barrier. This ensures that the autostereoscopic display simultaneously directs a left eye image to a left eye of the viewer and a right eye image to a right eye of the viewer. The resulting three-dimensional image may then appear to be in front of the display or further away than the display ('behind' the display). This technology also allows a viewer to experience perspective change of displayed content when he moves relative to the display, for example to look around a certain virtual object. A viewer may so perceive a three-dimensional reality without the need for unnatural peripherals such as a head set, a head-mounted display, glasses, etc. This allows him to directly see and hear important parts of the real environment (such as his own hands and feet, the floor, other persons interacting with him, etc.), while the autostereoscopic display forms a window to a virtual world. In such setting, a viewer experiences that he is physically present in the real world, part of which is a truly believable three-dimensional virtual environment. Such experience is often called an 'immersive experience'.

To enhance a viewer's experience of such virtual environment, autostereoscopic displays can be extended with other features. For example, features that allow a viewer to interact with a scene that is displayed or that stimulate other senses than vision, in particular hearing. However, the combination of sound with three-dimensional viewing suffers from some shortcomings.

Part of a desired virtual audiovisual experience is that, when a viewer of a scene (who in this case is also a listener) moves his/her head relative to the autostereoscopic display, this is reflected not only in the visual perspective on the scene, but also in the way the sound is perceived. For example, when a particular visible virtual item produces a sound, then the viewer should be able to recognize that the sound indeed originates from the particular item. Moreover, when directing one ear to the item, then—just like in reality—the viewer should perceive a more intense sound with that ear and not (so much) with the more remote ear. This is however not the case for conventional autostereoscopic displays, where the sound is optimized for the viewer at a specific position, usually centered in front of the display. This is conventionally achieved by positioning a plurality of loudspeakers (e.g. five or seven) around the viewer at specific locations (colloquially known as home cinema systems). Another conventional effort to improve the sound perception concerns the use of head phones or earbuds. It is however undesired to wear such unnatural peripherals since they disturb the audiovisual experience of the viewer (as also highlighted hereabove).

Another shortcoming that is experienced with conventional autostereoscopic displays concerns viewer interaction with the scene. For example, when a viewer moves a virtual object that he perceives in front of the display (e.g. by swiping), then the sound associated with such action does not properly correspond with that of the displayed image or movie.

Thus, it appears that the immersive experience provided to a viewer by conventional means is deficient, in particular as regards providing a real world sound perception of a virtual environment.

SUMMARY OF THE INVENTION

It is therefore an object of the present invention to provide a means and/or a method to improve the audiovisual experience provided by an autostereoscopic display, in particular to realize a more real sound perception when a viewer moves his/her head with respect to the autostereoscopic display and/or when a viewer interacts with a displayed scene.

It is a further object to provide a more immersive experience to the viewer than those that are possible with conventional autostereoscopic displays.

It has now been found that one or more of these objects can be reached by adapting not only the view, but also the sound to the position of the viewer's head relative to the autostereoscopic display.

Accordingly, in a first aspect the present invention relates to a method for simultaneously presenting to a viewer of an autostereoscopic display device a three-dimensional image displayed by the autostereoscopic display device; and a three-dimensional sound made by the autostereoscopic display device; the method comprising adapting the three-dimensional image as well as the three-dimensional sound to the position of the eyes and the ears, respectively, of the viewer relative to the autostereoscopic display device.

In a second aspect, the present invention relates to an autostereoscopic display device comprising an eye tracking system for determining the position of the eyes of a viewer relative to the display device;

means for determining the position of the ears of a viewer relative to the display device;

a display portion configured to display a three-dimensional image that is composed of a left image that is to be presented to a left eye of the viewer and a right image that is to be presented to a right eye of the viewer;

audio means configured to make three-dimensional sound;

a processor configured to produce image data to drive the display portion; and to produce sound data to drive the audio means;

wherein the processor comprises an audiovisual application comprising two virtual cameras configured to produce left image data and right image data to drive the display portion, taking into account the position of the eyes of the viewer relative to the display device;

two virtual microphones configured to produce left sound data and right sound data to drive the audio means, taking into account the position of the ears of the viewer relative to the display device.

DETAILED DESCRIPTION OF THE INVENTION

Figure 1:
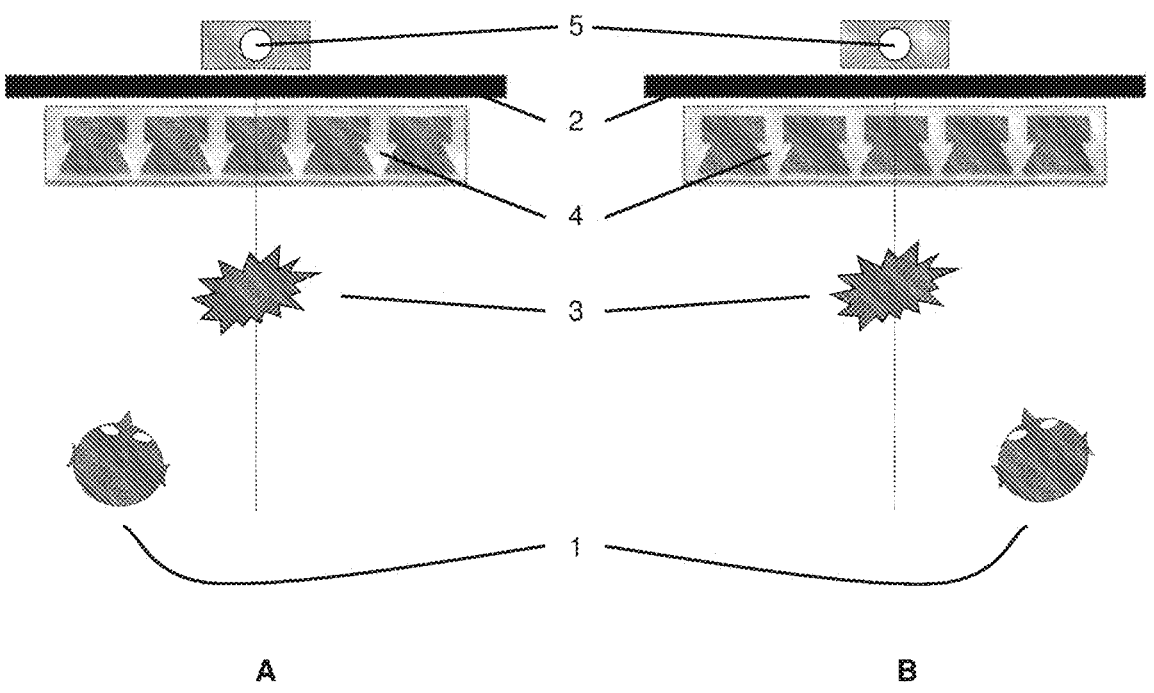
FIG. 1 schematically displays a top view of two settings wherein a viewer sits in front of an autostereoscopic display device.

Elements in the figures are illustrated for simplicity and clarity and have not necessarily been drawn to scale. For example, the dimensions of some of the elements in the figures may be exaggerated relative to other elements to help improve understanding of various exemplary embodiments of the present invention. In particular, the relative dimensions of a viewer, an autostereoscopic display device and a virtual object in a particular setting cannot be derived from the figures. Furthermore, the terms "first", "second", and the like herein, if any, are generally used for distinguishing between similar elements and not necessarily for describing a sequential or chronological order.

Throughout the description and claims, the terms 'three-dimensional image' and 'autostereoscopic image', are used interchangeably and refer to the same type of image. It is herewith recognized that an autostereoscopic image is strictly spoken not the same as a three-dimensional image. An autostereoscopic image is an image that is only perceived by a viewer as being three-dimensional, since it is composed of a left image that is to be presented to a left eye of the viewer and a right image that is to be presented to a right eye of the viewer. The same holds for the terms 'three-dimensional view' and 'autostereoscopic view', which, throughout this description, refer to the same type of view.

In the context of the invention, by the term 'left image' is meant the image that is displayed by an autostereoscopic display device for the left eye. Correspondingly, by the term "right image" is meant the image that is displayed by an autostereoscopic display device for the right eye. A left image and right image may also be displayed at an area close to the respective eye, as long as it does not hit the other eye. In practice, there is however always a small (or very small) portion of light that 'leaks' to the other eye (crosstalk), although viewers may not always be aware of this and still rate their three-dimensional viewing experience as satisfying.

In the context of the invention, the term 'image data' refers to image information that in some manner is inputted to an autostereoscopic display device of the method of the invention and converted into a format processable by this device. It may be recorded in a memory part associated with the device or it may be captured by a camera associated with the device (such camera may also be a camera remote from the device, capable of capturing images of a scene around a person participating in a videoconference in a different environment). Image data contains information that represents a visible image in that the image data can be used to generate a two- or three-dimensional image on the device. Left image data and right image data are specific forms of image data, falling under the above description of image data. In particular, left image data and right image data contain information that represents a visible left image or right image, respectively. A three-dimensional image is typically generated on the autostereoscopic display device using left image data and corresponding right image data.

In the context of the invention, the term 'sound data' refers to sound information that in some manner is inputted to an autostereoscopic display device of the method of the invention and converted into a format processable by this device. It may be recorded in a memory part associated with the device or it may be captured by a microphone associated with the device (such microphone may be a microphone remote from the device, capable of capturing sound of a scene around a person participating in a videoconference in a different environment). Sound data contains information that represents an audible sound in that the sound data can be used by the device to generate a two- or three-dimensional sound. Left sound data and right sound data are specific forms of sound data, falling under the above description of sound data. In particular, left sound data and right sound data contain information that represents an audible left sound or right sound, respectively. A three-dimensional sound is played by the autostereoscopic display device using left sound data and corresponding right sound data.

In the context of the invention, by the term 'viewer' is meant a person consuming the presented content that is generated by the method of the invention. Such person consumes not only the three-dimensional image but also the three-dimensional sound. For convenience, the person is referred to as 'viewer', although it is understood that he is at the same time also 'listener'. Throughout the text, references to the viewer will be made by male words like 'he', 'him' or 'his'. This is only for the purpose of clarity and conciseness, and it is understood that female words like 'she', and 'her' equally apply.

In the context of the invention, 'three-dimensional sound' refers to the way humans experience sound in their everyday lives in the real world. Sounds arrive at the ears from every direction and from varying distances, undergoing modification in the pinnae (auricles) and inside one's head. These factors contribute to the three-dimensional aural image that humans hear. In the context of the invention, three-dimensional sound may be the real sound in the environment wherein humans live, or it may be the simulation thereof by technical means that gives humans the perception of a real sound.

In the context of the invention, 'three-dimensional audio' refers to records of sound waves, for example live-recorded sound waves, streamed sound waves or artificially created sound waves, from which three-dimensional sound may be produced. The result is then that different sounds are perceived from different three-dimensional locations, even though the sounds may just be produced from just two speakers. Thus, a three-dimensional audio system is able to simulate a realistic auditory event by convincing the brain that a sound originates not from the loudspeakers or headphones, but from an arbitrary point in three-dimensional space.

Three-dimensional audio may be a live recorded three-dimensional sound, or it may be computer generated using sound processing algorithms to alter prerecorded sounds or sound effects as they travel through a virtual space and wrap around a virtual head therein. In case of a live recorded three-dimensional sound, the recording is termed a 'binaural audio' recording. This is a method of recording sound that uses two microphones representing both ears of a listener. This is known as dummy head recording, wherein a e.g. mannequin head is fitted with a microphone in each ear. Thus, binaural audio is the term used to describe audio content that can produce a three-dimensional sound image in a way that a person would hear the sound exactly as he would in the real world.

Although binaural audio is originally intended for replay using headphones (as result of technical limitations), recent new technological advancement has allowed proper translation over loudspeakers. Herein, it is not needed that they surround the listener. This requires two or more loudspeakers, typically an array of 4 or more loudspeakers, which are driven by a cross-talk cancellation unit. A particular development concerns the adaptivity of cross-talk cancellation to the position of the listener, so that he is not limited to taking place in the so-called sweet-spot of the sound field (see e.g. WO2017158338A1).

A method of the invention makes use of an autostereoscopic display device. This is typically a device that is largely stationary in the real world during its use, such as a desktop device or a wall-mounted device. For example, the autostereoscopic display device is a television, a (desktop) computer with a monitor, a laptop, or a cinema display system. It may however also be a portable device such as a mobile phone, a tablet or a game console, allowing a viewer to (freely) move in the real world together with the autostereoscopic display device.

Autostereoscopic display devices are known in the art, e.g. from WO2013120785A2. The main components of an autostereoscopic display device are an eye tracking system, a processor, a display portion and audio means.

The eye tracking system comprises means for tracking the position of the viewer's eyes relative to the autostereoscopic display device and is in electrical communication with the processor. Its principal components are 1) a camera that is directed at the field of view of the display portion; and 2) an eye tracker that processes the data generated by the camera.

The display portion comprises means for displaying a three-dimensional image to a viewer whose eyes are tracked by the eye tracking system. Such means comprise an array of pixels for producing a display output and a parallax barrier or a lenticular lens that is provided over the array to direct a left image to the viewer's left eye and a right image to the viewer's right eye.

The audio means comprise means for playing three-dimensional sound to the viewer. For example, audio means comprise items such as stereo loudspeakers, loudspeaker arrays, head phones or earbuds.

The processor is configured to produce left and right image data and to drive the display portion therewith, taking into account the data obtained by the eye tracking system. An important component of the processor is therefore the so-called 'weaver', which weaves a left image and a right image to the array of pixels, thereby determining which pixels are to produce pixel output in correspondence with the respective image. In this way, a three-dimensional image can be displayed from left and right image data, to a viewer at a particular position.

The processor is also configured to produce left and right sound data to produce three-dimensional audio therewith; and to drive the audio means therewith, taking into account the data obtained by the eye (and optionally ear) tracking system.

An optional component of the processor is the so-called 'cross-talk cancellation unit', which is to be used when the audio means does not comprise head phones, earbuds or other devices that are worn at the ears. It prevents that sound intended for the left ear is noticeable by the right ear, and vice versa.

In a method of the invention, the autostereoscopic display device may further be provided with additional features such as an audiovisual application, an ear tracking system, a system for tracking other body parts than eyes and ears, a system for tracking objects associated with the viewer, and means for providing multiple autostereoscopic views (as will be further elaborated below).

In a method of the invention, a three-dimensional image and a three-dimensional sound are presented simultaneously to a viewer. In doing so, not only the three-dimensional image is adapted to the position of the viewer, but also the three-dimensional sound is adapted to the position of the viewer. In particular, the three-dimensional image is adapted to the position of the viewer's eyes and the three-dimensional sound is adapted to the position of the viewer's ears. Herein, by the position of the viewer is meant the position relative to the autostereoscopic display device.

By adaptation of a three-dimensional image to the position of the viewer's eyes is meant that the perspective view of the three-dimensional image is altered in accordance with the viewer's position relative to the autostereoscopic display device. In this way, the viewer may realistically look around an object (the so-called 'look around effect').

Analogously, by adaptation of a three-dimensional sound to the position of the viewer's eyes is meant that the three-dimensional sound is altered in accordance with the viewer's position relative to the autostereoscopic display device (which is analogously termed the 'hear around effect').

A situation wherein a three-dimensional image as well as a three-dimensional sound is adapted to the viewer's position is illustrated in FIG. 1, which displays a top view of two settings (A and B) wherein a viewer (1) sits in front of an autostereoscopic display device (2) comprising a camera (5) and audio means (4), represented by an array of audio speakers. In setting A, the viewer (1) sees at his right front a virtual audiovisual object (3) with a fixed position in the environment in front of the autostereoscopic display device. In setting B, the viewer has changed his position, so that he sees the same virtual object (3) at his left front. During the change of the viewer's position, the auditory as well as the visual perception of this virtual object (3) has been adapted to the viewer's position. For example, a sound made by the audio means (4) is perceived to originate from the virtual object (3) at the viewer's right front in setting A and at the viewer's left front in setting B (i.e. the viewer perceives a hear around effect). At the same time, the view of the virtual object (3) provided by the autostereoscopic display (2) has changed in the sense that some parts that were visible in setting A have become out of sight in setting B, while other parts only have become visible for the first time in setting B (i.e. the viewer perceives a look around effect). Thus, FIG. 1 illustrates that a method of the invention allows virtual content to be adapted to viewer position, so that it is visually as well as auditorily experienced as reality. For completeness' sake, it is noted that the same effects would be perceived when the viewer (1) remains stationary with respect to the autostereoscopic display (2) during movement of the virtual object (3) with respect to the virtual viewer (1).

Whereas the invention is related to simultaneously presenting to a viewer a three-dimensional image and a three-dimensional sound, it has to be stressed that the three-dimensional sound, or at least a part thereof, is not necessarily associated with the three-dimensional image or any part thereof. Virtual objects that are invisible to the viewer may produce sound that is perceived by the viewer, such as a virtual bug flying above the viewer's head or a virtual clock that is ticking behind the viewer. Such objects are by definition not visible to the viewer, even if the viewer turns his/her head towards them, since they do not reside between the viewer and the display portion. Nevertheless, when the viewer moves his/her head relative to the display, he will have a different perception of the sound of the bug or the clock. At the same time, he will perceive a changing perspective of the displayed three-dimensional image. In other words, an area wherein the three-dimensional image is presented to the viewer may be smaller than an area wherein the three-dimensional sound is presented to the viewer.

In a method of the invention, the autostereoscopic display device typically comprises:

an eye tracking system for determining the position of the eyes of the viewer relative to the display device;

means for determining the position of the ears of the viewer relative to the display device;

a display portion configured to display a three-dimensional image that is composed of a left image that is to be presented to a left eye of the viewer and a right image that is to be presented to a right eye of the viewer;

audio means configured to make three-dimensional sound;

a processor configured to produce left image data and right image data to drive the display portion; and to produce left sound data and right sound data to drive the audio means.

Such method typically comprises the steps of:

a) determining the viewing position of the eyes of a viewer relative to the autostereoscopic display device using the eye tracking system;

b) producing left image data and right image data for the display portion, taking into account the position of the eyes of the viewer relative to the autostereoscopic display device;

c) determining the hearing position of the ears of a viewer relative to the autostereoscopic display device using the eye tracking system and/or an optional ear tracking system;

d) producing left sound data and right sound data for the audio means, taking into account the position of the ears of the viewer relative to the display device;

e) driving the display portion and the audio means with the image data and sound data, respectively, to thereby simultaneously present to a viewer a three-dimensional image and three-dimensional sound.

Usually, the method steps a) to e) are repeated a large number of times, for example at a rate of at least one repetition per second, at a rate of at least 10, least 25, at least 40 or at least 50 repetitions per second. In particular, the rate is in the range of 27-33, in the range of 57-63 or in the range of 87-93 repetitions per second. A higher rate produces sequential images at a higher frequency, which is perceived by the viewer as a movie. A higher rate also means that the three-dimensional image as well as the three-dimensional sound is more accurately adapted to the viewer position. For example, when the viewer makes fast movements relative to the autostereoscopic display device, these movements are timely accounted for when the method of the invention is carried out at a high repetition rate.

In an alternative wording, the invention relates to a method for driving an autostereoscopic display device, the method comprising simultaneously presenting to a viewer of the autostereoscopic display device a three-dimensional image displayed by the autostereoscopic display device; and a three-dimensional sound made by the autostereoscopic display device;

wherein the three-dimensional image as well as the three-dimensional sound is adapted to the position of the eyes and the ears, respectively, of the viewer relative to the autostereoscopic display device.

In an embodiment, the processor of the autostereoscopic display device comprises an audiovisual application, which is configured to produce image data and sound data from which the three-dimensional image and three-dimensional sound, respectively, are generated (herein, the image data consist of left image data and right image data; and the sound data consist of left sound data and right sound data). In the audiovisual application, the actual adaptation of the three-dimensional image and the three-dimensional sound to the viewer position relative to the autostereoscopic display device takes place (more specifically, the eyes position and ears position, respectively). It allows the viewer to simultaneously perceive the 'look around effect' and the 'hear around effect'. The position data produced by the eye tracking system serve as input to perform this function, optionally by using a separate ear tracking system.

The audiovisual application typically combines a virtual three-dimensional environment with a real environment in front of the display portion (typically being in its field of view). This occurs at least in a way that yields the position of the viewer (a real entity) relative to the virtual three-dimensional environment, in particular the position of his eyes and ears, using position data on his eyes and ears that are obtained by performing the method of the invention. In other words, there is a virtual three-dimensional environment that is complemented with some real world items, which are (at least) the eyes and ears of the viewer. Moreover, the eyes and ears of the viewer have a known position relative to the virtual three-dimensional environment. Other elements present in the real world may also be 'added' to the virtual three-dimensional environment, such as other body parts of the viewer (e.g. a finger or a foot) or objects such as a stylus pen or a pencil. Of course, this occurs also with a known the position of such body part or object relative to the virtual three-dimensional environment.

The audiovisual application comprises two virtual cameras and two virtual microphones, all of which have a position in the virtual three-dimensional environment; each of the two virtual cameras has the position of an eye of the viewer and each of the two virtual microphones has the position of an ear of the viewer. The two virtual cameras then produce (render) the left image data and the right image data, while the two virtual microphones produce the left sound data and the right sound data.

The input for these virtual cameras and virtual microphones is typically provided by an audiovisual memory (e.g. relevant libraries and support programs that are associated with the audiovisual application). The audiovisual memory typically comprises a representation of a three-dimensional environment that is to be presented to a viewer, and which is capable of being modified by input from the real world, such as an action of the user. Such action is for example pressing a virtual button that is positioned in the virtual three-dimensional environment or hitting a bug that is flying in the virtual three-dimensional environment—a button or bug that is presented on the display portion and perceived as being in front of the display portion. Actions may also involve the use of a stylus pen, for example to press a button or make a three-dimensional drawing.

With virtual cameras and virtual microphones on his head, the viewer can navigate in the virtual three-dimensional environment in real-time. On the one hand by moving himself relative to the autostereoscopic display, on the other hand by moving the virtual three-dimensional environment relative to himself, e.g. by using a mouse, joystick or keyboard shortcuts. He can also manipulate the virtual three-dimensional environment by pressing a button or hitting a bug, which action may cause the autostereoscopic display device to play a sound that corresponds to such action.

The virtual cameras are then defined as points in the virtual three-dimensional environment at a given position and orientation (six degrees of freedom). They can be moved and/or re-oriented therein and so define the position, direction and angle of view for generating the left and right image data.

A similar consideration applies for the virtual microphones as they are also defined as points in the virtual three-dimensional environment that can be moved and/or re-oriented therein. They define the way sound will be perceived at their particular position and orientation within the virtual three-dimensional environment, and generate the left and right sound data in accordance with this.

As noted above, input for the virtual cameras and virtual microphones is typically formed by an audiovisual memory. It may comprise a database of elements in a virtual world, of which the locations and orientations relative to the viewer are known in real-time thanks to the eye tracking system and ear tracking system. Besides their locations and orientation, other properties of the elements may also be known, such as surface properties, mechanical behavior (e.g. to be applied when elements collide), production of sound, reflection of sound and reflection of light.

The input for the virtual cameras and virtual microphones may also be provided by an audiovisual live stream, for example of a remote scene. Such case finds an advantageous application in videoconferencing wherein the viewer interacts with another person in a different (and typically remote) scene by means of images and sound from their respective scenes. The position-adapted three-dimensional image and three-dimensional sound that each person experiences from the scene of the other person make that their interaction feels more natural than can be achieved with conventional teleconferencing means.

Accordingly, in a method of the invention, the three-dimensional image and the three-dimensional sound may be contained in a memory unit associated with the autostereoscopic display device or are provided by a live streaming of a certain scene.

Figure 2:
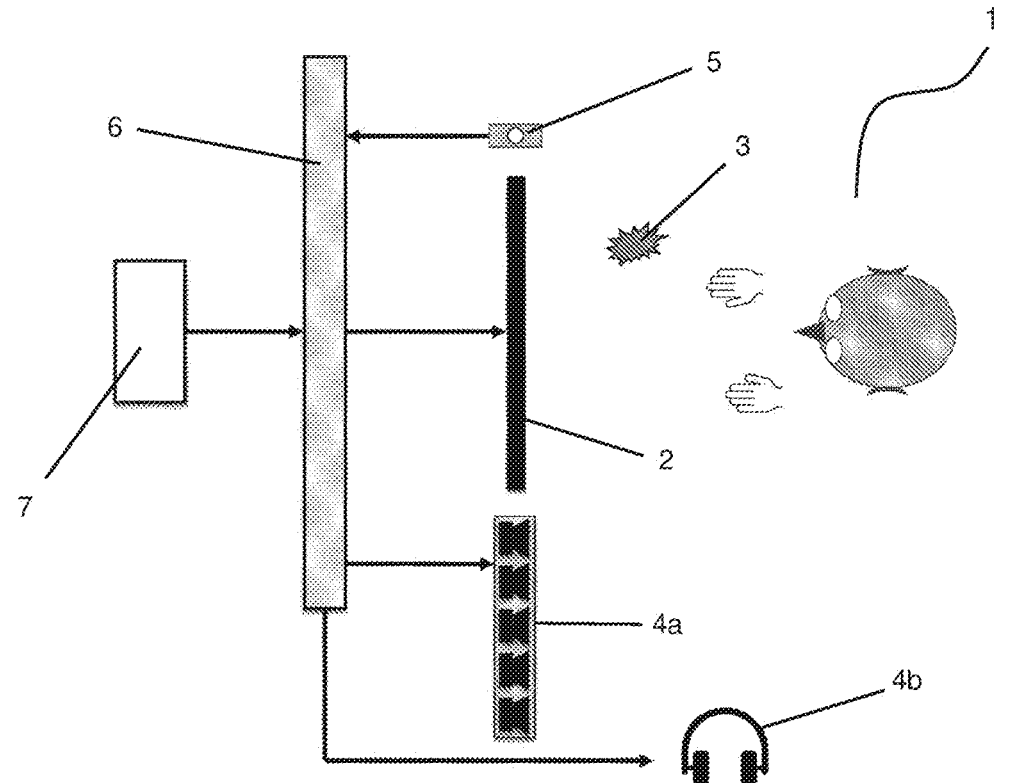
FIG. 2 is a first schematic representation of an architecture for carrying out the method of the invention.

The architecture that can carry out a method of the invention is schematically displayed in FIG. 2, which is a top view of a scene wherein a viewer (1) is positioned in front of a display portion (2) which displays a virtual object (3). Audio means (4) are also provided to the viewer (1), represented by an array of audio speakers (4a) or a set of headphones (4b). Further, a camera (5) is directed at the scene in front of the display portion (2), including at the viewer (1). The camera (5) is designed to capture data on the three-dimensionality of the scene. An audiovisual data provider (7) is present to provide the input of audiovisual data. A processor (6) is operably connected to the display portion (2), the audio means (4), the camera (5) and the audiovisual data provider (7). The processor (6) processes the data received from the camera (5) together with data received from the audiovisual data provider (7) to produce image data as input for the display portion (2) and sound data as input for the audio means (4).

Figure 3:
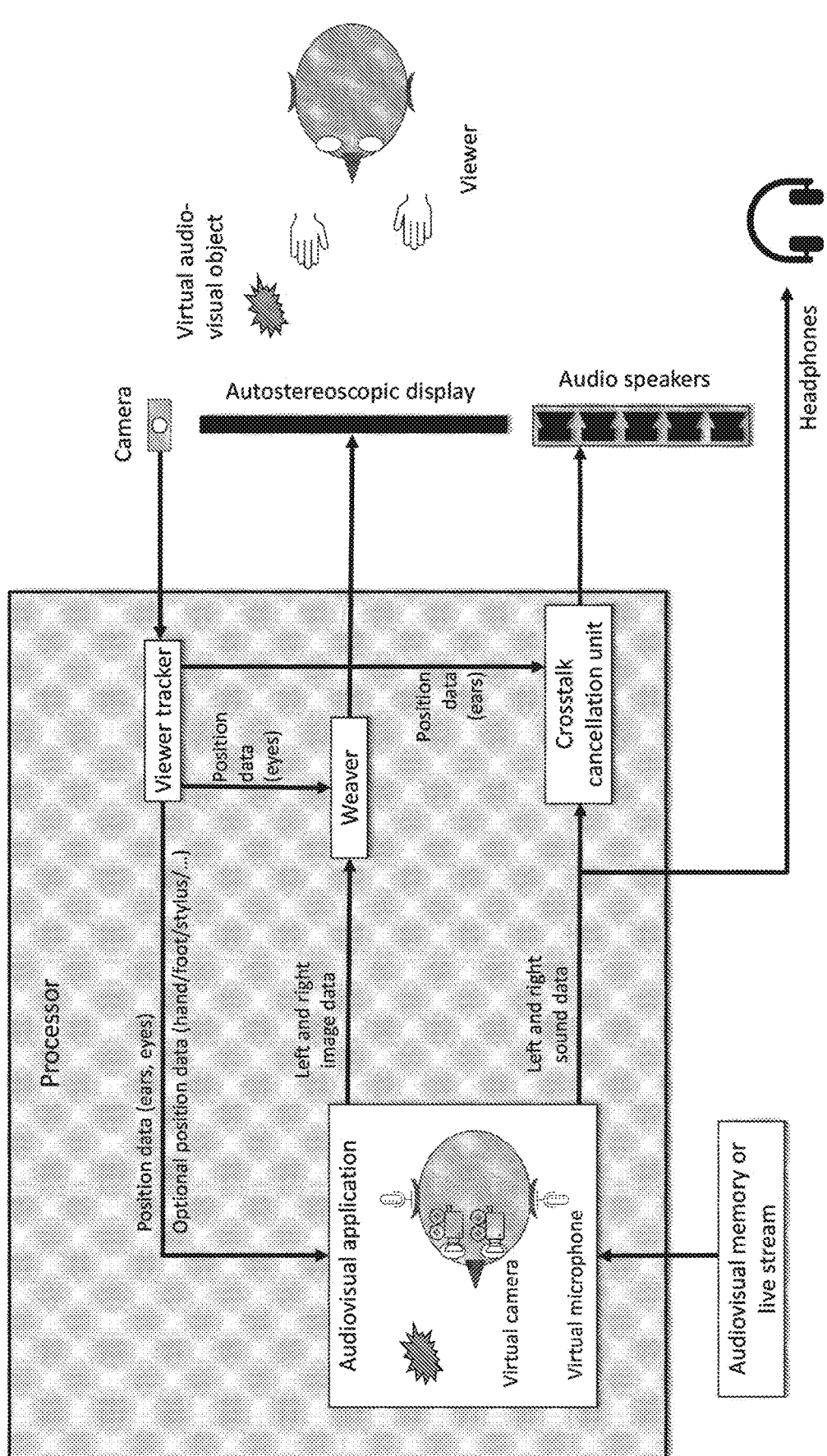
FIG. 3 is a second schematic representation of an architecture for carrying out the method of the invention.

FIG. 3 details the architecture of FIG. 2, displaying the different components of the processor and how they interact. The processor comprises a viewer tracker which is configured to produce position data on eyes and ears; and on eventual other body parts or objects. To do so, the viewer tracker receives data captured by the camera. A weaver, a cross-talk cancellation unit and an audiovisual application are also part of the processor and obtain the position data from the viewer tracker. The audiovisual application comprises two virtual cameras and two virtual microphones. The virtual cameras produce left image data and right image data as input for the weaver. The virtual microphones produce left sound data and right sound data as input for the audio means. In case audio speakers are used as the audio means, then the left sound data and right sound data are first processed by a cross-talk-cancellation unit. In case headphones are used as the audio means, then such unit is not necessary and the headphones can directly receive the left sound data and right sound data.

In a method of the invention, the position of the eyes of the viewer relative to the autostereoscopic display device is obtained by tracking the eyes of the viewer by using an eye tracking system that typically comprises 1) a camera that is directed at a viewer in a field of view of the display portion of the autostereoscopic display device; and 2) an eye tracker that processes the data generated by the camera. The obtained positional data on the eyes allow that a left image and a right image are accurately projected to the respective eye of the viewer; and these data also allow that the displaying of the three-dimensional image is adapted to the position of the viewer, so that he may perceive the look around effect.

The camera in an eye tracking system (in the art also known as a 'range camera') is generally a light sensor device that is capable of gathering information on the distance between one or more particular points in a scene (on the one hand) and the camera (on the other hand). The points are typically part of a head or part of an eye that is within the field of view of the camera. The device can operate according to one of a number of different techniques. Typically, these techniques are stereo triangulation, sheet of light triangulation, structured light and time-of-flight. There may be a plurality of cameras present in an eye tracking system.

The camera may in particular be a device that is capable of capturing a visual or an infrared image of a scene and gathering information on the distance between one or more particular points in the scene and the camera that are part of a head or part of an eye, typically by stereo triangulation.

The eye tracker in the eye tracking system that processes the data of the camera is configured to actually calculate the position of both eyes (in particular the eye sockets, more in particular their pupils) relative to the camera or to another part that is fixed to the camera, such as the display portion. In case the camera is capable of capturing a visual or an infrared image of a scene, the eye tracker is typically also capable of recognizing an eye in a captured visual or infrared image.

An eye tracking system used in a method of the invention is capable of tracking the eyes of at least one person. It may also be capable of tracking the eyes of multiple persons. If so, it may also be configured to discriminate between individual persons or identify individual persons by means of face recognition.

The eye tracking system may also be configured to track other body parts than an eye, such as a hand, a foot, an arm, a leg or an ear. Besides body parts of the viewer, the system may also be configured to track objects, in particular objects that are controlled by the viewer. Such objects can be 'random' objects such as a random pen or ball; or 'compatibilized' objects that are capable of being detected by the tracking system, for example by equipping them with a marker that can be recognized, such as a stylus pen.

When it is desired to describe the system's capability to track one or more body parts of a viewer additional to the eyes, and/or eventual objects associated with the viewer, the terms 'eye tracking system' and 'eye tracker' are in this description generalized to 'viewer tracking system' and 'viewer tracker', respectively. Thus, the term 'viewer tracking system' is meant to include at least an eye tracking system.

The position of the ears of the viewer can be determined in different manners in a method of the invention. It can for example be derived from the position of the eyes. Since this position is known via the eye tracking system, it is not necessary to apply an ear tracking system.

It is however also possible to specifically track the ears by an ear tracking system (if so, such system is typically part of a viewer tracking system as defined above). However, this is may not be effective in all cases, since an ear can become out the field of view of a camera for ear tracking. In such cases, a combination of using eye tracking information and ear tracking may be effective. Thus, in a method of the invention, the means for determining the position of the ears of the viewer relative to the autostereoscopic display device may comprise an ear tracking system and/or means to derive the position of the ears from the position of the eyes as determined with the eye tracking system.

In a method of the invention, the three-dimensional sound is made by the audio means. These means may be divided in three groups: 1) those that are worn by the viewer and so have a substantially fixed position with respect to the viewer's ears; and 2) those that are attached to the autostereoscopic display device or that have another stationary position in that they have a substantially fixed position with respect to the autostereoscopic display device; 3) those that have a stationary position with respect to the real world, but not to the viewer and the autostereoscopic display device. In the first case, the three-dimensional sound is typically experienced through headphones or earbuds (so the audio means in such case comprises headphones or earbuds). In the second and the third case, the three-dimensional sound is typically experienced through remote loudspeakers or a loudspeaker array (so the audio means in such case comprises loudspeakers or a loudspeaker array).

In the second and third case (i.e. with remote speakers), it is required that the autostereoscopic display device, in particular its processor, comprises a cross-talk cancellation unit. Such unit is configured to separate sounds produced by the audio means between both of the viewer's ears (i.e. to prevent that sound intended for the left ear is noticeable by the right ear, and vice versa). This would otherwise occur, since distant loudspeakers are normally not selective in reaching one particular ear. Headphones or earbuds, on the other hand, have this capability by design. Such unit is typically also configured to cancel any distortion occurring between an ear and a loudspeaker, as it compensates for the distortion of the sound by the asymmetric form of the pinnae and their inner structure (also called Head Related Transfer Functions (HRTF). An effective cross-talk cancellation unit in fact creates virtual headphones at the listener's ears so that a set of binaural signals is delivered cleanly and without distortion, Thus, a cross-talk cancellation unit is capable of 1) separating sounds, reproduced by the audio means, between both of the viewer's ears; and 2) cancelling any distortion occurring between an ear and a loudspeaker.

An autostereoscopic display device used in a method of the invention is typically capable of displaying two views, so as to provide for a single autostereoscopic view. It may however also be capable of displaying three or more views, allowing for multiple autostereoscopic views, and thus allowing for multiple simultaneous viewers to participate. If so, the autostereoscopic display device may be configured to discriminate between individual persons or identify individual persons by means of face recognition.

As regards the three-dimensional sound when a plurality of viewers participate, the audio means are preferably worn by the viewers on their ears, since this prevents that a viewer hears the sound that is intended for another viewer.

The method of the invention demonstrates that image and sound of one and the same virtual scene can simultaneously be presented to a viewer as if they were of a real scene; both are experienced three-dimensionally and in accordance with movement of the viewer in the scene. It is also possible that the scene is not a real scene (in the sense that it is not a recording of a real scene), but an artificially prepared scene, such as an animation. The present invention is therefore also advantageously applied in the playing of computer games. This immersion of the viewer in the (real or artificial) scene forms an major improvement with respect to known methods for realizing an immersion in a scene.

A method of the invention can particularly advantageously be applied in situations wherein a viewer interacts with the scene that is displayed, and when such interaction has the intention to produce a particular sound. For example, a viewer may push a virtual button or break a virtual glass, with e.g. a hand or a foot. The sound that is associated with such events can be presented to a viewer in a way that closely mimics the way how he would perceive such event in reality. To this end, the method of the invention may be supplemented with an additional tracking system for tracking a further body part as already described above. Such further body part is for example a body part other than an eye or an ear, for example a hand or a foot. These advantageous features of the present invention make the invention present invention an attractive means to play computer games.

A further body part is not necessarily present in the field of view of the screen. For example, a foot may interact with a part of the scene that is not visible to the viewer, at least not at the moment of the interaction. To this end, such body part may preferably be tracked by a tracking system that has its camera remote from the autostereoscopic display device, so that it is better positioned in the camera's field of view.

The method of the invention may also be supplemented with an additional tracking system for tracking an object associated with the viewer. A viewer who holds such object in his hand, for example a pencil or a stylus pen, is so allowed to make a three-dimensional drawing that he can see on his own autostereoscopic display device. Alternatively, in a teleconferencing setting with another person, it is possible for this other person to view the drawing. The object may be used for various other purposes, such as pressing at virtual buttons, swiping virtual objects or making three-dimensional selection spaces.

Accordingly, in a method of the invention, the autostereoscopic display device may comprise an additional tracking system for tracking an object or a further body part, which is a body part other than an eye or an ear such as a hand or a foot, the method comprising the steps of 1) determining the position and/or the speed of the object or further body part relative to the autostereoscopic display device by using the additional tracking system;

2) deciding whether a particular three-dimensional image and/or a particular three-dimensional sound is to be associated with the determined speed and/or position of the object or further body part;

3) producing the image data for the display portion and/or the sound data for the audio means, taking into account the decision of step 2).

In this embodiment, use is typically also made of the position and/or the speed of the object or further body part relative to the autostereoscopic display device, as determined by the additional tracking system in step 1). From these position and/or speed data, and from the position of the eyes and ears of the viewer relative to the autostereoscopic display device, the position of the object or further body part relative to the eyes and ears of the viewer can be derived. This position forms input for the production of the image data and the sound data. For example, when a virtual three-dimensional line drawing is made with a real pencil, then a line, drawn with the pencil, needs to be displayed three-dimensionally (this is then an image associated with the pencil, represented by the image data); or when a virtual bell is triggered by a real finger, then the sound of the bell needs to be played three-dimensionally (this is then a sound associated with the finger, represented by the sound data). In these two examples, account is thus taken of the position of the pencil or finger, respectively, relative to the eyes and ears of the viewer, in order to produce the image data for the display portion and the sound data for the audio means, respectively. The image data then represents a three-dimensional image associated with the pencil; and the sound data then represents a three-dimensional sound associated with the tracked object or further body part.

The object may in particular be a pointing device such as a pen, a pencil or a stylus pen. In this context, by 'stylus pen' (or simply 'stylus') is meant a pen-shaped instrument which has a function as a pointing device and/or a drawing device, similar to a mouse or touchpad. To this end, a stylus pen can be detected by the autostereoscopic display device, in particular by a tracking system designed therefor such as a viewer tracking system.

This function wherein the image and the sound also match the interactions of the viewer (including objects controlled by the viewer) with virtual content makes virtual experiences obtained by a method of the invention even more immersive to a viewer.

A method of the invention may in particular be used in teleconferencing. By teleconferencing is meant a live exchange of information among several persons and machines remote from one another but linked by a telecommunications system.

The invention further relates to an autostereoscopic display device comprising an eye tracking system for determining the position of the eyes of a viewer relative to the display device;

means for determining the position of the ears of a viewer relative to the display device;

a display portion configured to display a three-dimensional image that is composed of a left image that is to be presented to a left eye of the viewer and a right image that is to be presented to a right eye of the viewer;

audio means configured to make three-dimensional sound;

a processor configured to produce image data to drive the display portion; and to produce sound data to drive the audio means;

wherein the processor comprises an audiovisual application comprising two virtual cameras configured to produce left image data and right image data to drive the display portion, taking into account the position of the eyes of the viewer relative to the display device;

two virtual microphones configured to produce left sound data and right sound data to drive the audio means, taking into account the position of the ears of the viewer relative to the display device.

In an embodiment, the audio means of an autostereoscopic display device of the invention comprises headphones or earbuds that have a variable position with respect to the autostereoscopic display device.

In a further embodiment, the means for determining the position of the ears of the viewer relative to the autostereoscopic display device comprises an ear tracking system and/or means to derive the position of the ears from the position of the eyes as determined with the eye tracking system.

In a further embodiment, the autostereoscopic display device of the invention comprises 1) loudspeakers that have a substantially fixed position with respect to the autostereoscopic display device; and 2) a cross-talk cancellation unit to separate sounds produced by the audio means between both of the viewer's ears and to cancel any distortion occurring between an ear and a loudspeaker.

In a further embodiment, the autostereoscopic display device of the invention comprises an additional tracking system for tracking an object or a further body part, which is a body part other than an eye or an ear, such as a hand or a foot. The autostereoscopic display device is then typically configured to play a three-dimensional sound associated with the object or body part, taking into account the position of the ears of the viewer relative to the display device;

display a three-dimensional image associated with the object or body part, taking into account the position of the eyes of the viewer relative to the display device.

The invention further relates to a kit comprising such autostereoscopic display device and a stylus pen, wherein the additional tracking system is configured to track the stylus pen. The autostereoscopic display device is then typically configured to play a three-dimensional sound associated with the stylus pen, taking into account the position of the ears of the viewer relative to the display device;

display a three-dimensional image associated with the stylus pen, taking into account the position of the eyes of the viewer relative to the display device.

The invention claimed is:

1. A method for simultaneously presenting to a viewer of an autostereoscopic display device a three-dimensional image displayed by the autostereoscopic display device and a three-dimensional sound made by the autostereoscopic display device, wherein the autostereoscopic display device comprises:

an eye tracking system for determining the position of the eyes of the viewer relative to the autostereoscopic display device;

a position system to determine the position of the ears of the viewer relative to the autostereoscopic display device;

a display portion configured to display a three-dimensional image;

an audio system configured to make three-dimensional sound; and a processor configured to produce image data to drive the display portion; and to produce sound data to drive the audio system; and wherein the method comprises adapting the three-dimensional image as well as the three-dimensional sound to the position of the eyes and the ears, respectively, of the viewer relative to the autostereoscopic display device by:

a) determining the position of the eyes of the viewer relative to the autostereoscopic display device using the eye tracking system;

b) producing image data for the display portion, taking into account the position of the eyes of the viewer relative to the autostereoscopic display device;

c) determining the position of the ears of a viewer relative to the autostereoscopic display device using the eye tracking system and/or an ear tracking system;

d) producing sound data for the audio system, taking into account the position of the ears of the viewer relative to the autostereoscopic display device;

e) driving the display portion and the audio system with the image data and sound data, respectively, to thereby simultaneously present to a viewer a three-dimensional image and three-dimensional sound;

f) optionally repeating steps a) to f) after a certain time interval; and wherein the autostereoscopic display device further comprises an additional tracking system for tracking an object or a further body part, which is a body part other than an eye or an ear, the method comprising the steps of:

1) determining the position and/or the speed of the object or further body part relative to the autostereoscopic display device by using the additional tracking system;

2) deciding whether a particular three-dimensional image and/or a particular three-dimensional sound is to be associated with the object or further body part; and 3) producing the image data for the display portion and/or the sound data for the audio system, taking into account the decision of step 2) and using the position and/or the speed of the object or further body part relative to the autostereoscopic display device, as determined by the additional tracking system in step 1).

2. The method according to claim 1, wherein the position system comprises an ear tracking system and/or a system to derive the position of the ears from the position of the eyes as determined with the eye tracking system.

3. The method according to claim 2, wherein the processor further comprises an audiovisual application comprising two virtual cameras and two virtual microphones;

the audiovisual application combines a virtual three-dimensional environment with a real environment in front of the display portion, at least to the extent that the virtual three-dimensional environment comprises the eyes and ears of the viewer, wherein the position of the eyes and ears of the viewer relative to the virtual three-dimensional environment are known;

each of the two virtual cameras has the position of an eye of the viewer and together produce the image data from audiovisual input data representing the virtual three-dimensional environment; and each of the two virtual microphones has the position of an ear of the viewer and together produce the sound data from audiovisual input data representing the virtual three-dimensional environment.

4. The method according to claim 2, wherein the audio system comprises loudspeakers that have a substantially fixed position with respect to the autostereoscopic display device; and the autostereoscopic display device comprises a cross-talk cancellation unit to separate sounds produced by the loudspeakers between both of the viewer's ears and to cancel any distortion occurring between an ear and a loudspeaker.

5. The method according to claim 2, wherein the audio system comprises headphones or earbuds that have a substantially fixed position with respect to the viewer's ears.

6. The method according to claim 1, wherein the steps a) to e) are repeated at a rate of at least one repetition per second.

7. The method according to claim 1, wherein at least a part of the three-dimensional sound is not associated with the three-dimensional image or any part thereof.

8. The method according to claim 1, wherein the autostereoscopic display device is selected from the group of televisions, desktop computers with a monitor, laptops, cinema display systems, mobile phones, tablets and game consoles.

9. The method according to claim 1, wherein the object is a pointing device.

10. The method according to claim 9, wherein the pointing device is a pen, a pencil or a stylus pen.

11. The method according to claim 1, wherein the three-dimensional image and the three-dimensional sound are contained in a memory unit associated with the autostereoscopic display device or are provided by a live streaming of a certain scene.

12. The method according to claim 1, wherein the method is used in teleconferencing.

13. An autostereoscopic display device comprising:

an eye tracking system for determining the position of the eyes of a viewer relative to the autostereoscopic display device;

a position system for determining the position of the ears of a viewer relative to the autostereoscopic display device;

a display portion configured to display a three-dimensional image that is composed of a left image that is to be presented to a left eye of the viewer and a right image that is to be presented to a right eye of the viewer;

an audio system configured to make three-dimensional sound; and a processor configured to produce image data to drive the display portion; and to produce sound data to drive the audio system; wherein the processor comprises an audiovisual application comprising:

two virtual cameras configured to produce left image data and right image data to drive the display portion, taking into account the position of the eyes of the viewer relative to the autostereoscopic display device; and two virtual microphones configured to produce left sound data and right sound data to drive the audio system, taking into account the position of the ears of the viewer relative to the autostereoscopic display device, and wherein the autostereoscopic display device further comprises:

an additional tracking system configured to track an object or a further body part, which is a body part other than an eye or an ear, such as a hand or a foot;

wherein the autostereoscopic display device is configured to:

play a three-dimensional sound associated with the object or body part, taking into account the position of the ears of the viewer relative to the autostereoscopic display device and the position of the object or further body part relative to the autostereoscopic display device; and display a three-dimensional image associated with the object or body part, taking into account the position of the eyes of the viewer relative to the autostereoscopic display device and the position of the object or further body part relative to the autostereoscopic display device.

14. The autostereoscopic display device according to claim 13, wherein the object is a pointing device.

15. The autostereoscopic display device according to claim 14, wherein the pointing device is a pen, a pencil or a stylus pen.

16. The autostereoscopic display device according to claim 13, wherein the audio system comprises loudspeakers that have a substantially fixed position with respect to the autostereoscopic display device;

the autostereoscopic display device comprises a cross-talk cancellation unit to separate sounds produced by the loudspeakers between both of the viewer's ears and to cancel any distortion occurring between an ear and a loudspeaker.

17. The autostereoscopic display device according to claim 13, wherein the audio system comprises headphones or earbuds that have a variable position with respect to the autostereoscopic display device.

18. The autostereoscopic display device according to claim 13, wherein the position system comprises an ear tracking system and/or a system to derive the position of the ears from the position of the eyes as determined with the eye tracking system.

19. A combination comprising an autostereoscopic display device according to claim 13, and a pen, a pencil or a stylus pen, wherein the additional tracking system is configured to track the stylus pen, and wherein the autostereoscopic display device is configured to:

play a three-dimensional sound associated with the stylus pen, taking into account the position of the ears of the viewer relative to the autostereoscopic display device and the position of the stylus pen relative to the autostereoscopic display device; and display a three-dimensional image associated with the stylus pen, taking into account the position of the eyes of the viewer relative to the autostereoscopic display device and the position of the stylus pen relative to the autostereoscopic display device.

* * * * *